(12) United States Patent
Defilippi et al.

(10) Patent No.: US 8,827,321 B2
(45) Date of Patent: Sep. 9, 2014

(54) PIPE COUPLING DEVICE

(71) Applicant: Emer S.p.A., Eufemia (IT)

(72) Inventors: Roberto Defilippi, Botticino (IT); Francesco Noventa, Botticino (IT)

(73) Assignee: Emer, S.p.A., Brescia (IT)

( * ) Notice: Subject to any disclaimer, the term of this patent is extended or adjusted under 35 U.S.C. 154(b) by 0 days.

(21) Appl. No.: 13/975,843

(22) Filed: Aug. 26, 2013

(65) Prior Publication Data

US 2013/0341915 A1 Dec. 26, 2013

Related U.S. Application Data

(63) Continuation of application No. PCT/IT2011/000032, filed on Feb. 8, 2011.

(51) Int. Cl.
*F16L 21/06* (2006.01)
*F16L 37/133* (2006.01)
*F02M 21/02* (2006.01)
*F02M 55/00* (2006.01)

(52) U.S. Cl.
CPC ............... *F16L 37/133* (2013.01); *Y02T 10/32* (2013.01); *F02M 55/005* (2013.01); *F02M 21/0296* (2013.01); *F02M 2200/8023* (2013.01); *F02M 21/0212* (2013.01)
USPC .............................. 285/322; 285/323; 285/81

(58) Field of Classification Search
USPC ....................... 285/322, 323, 83, 81
See application file for complete search history.

(56) References Cited

U.S. PATENT DOCUMENTS

| | | | | |
|---|---|---|---|---|
| 4,005,883 A | * | 2/1977 | Guest | 285/322 |
| 4,804,213 A | * | 2/1989 | Guest | 285/322 |
| 5,084,954 A | * | 2/1992 | Klinger | 285/308 |
| 5,284,369 A | * | 2/1994 | Kitamura | 285/322 |
| 5,370,423 A | * | 12/1994 | Guest | 285/322 |
| 5,607,193 A | * | 3/1997 | Guest | 285/322 |

(Continued)

FOREIGN PATENT DOCUMENTS

| | | |
|---|---|---|
| EP | 0317249 A1 | 5/1989 |
| EP | 1154190 A2 | 11/2001 |
| FR | 2666134 A1 | 2/1992 |
| WO | 03029716 A1 | 4/2003 |

OTHER PUBLICATIONS

International Search Report and Written Opinion of the International Searching Authority issued on Dec. 7, 2012, in connection with International Application No. PCT/IT2011/000032.

(Continued)

*Primary Examiner* — David E Bochna
(74) *Attorney, Agent, or Firm* — Corridor Law Group, P.C.

(57) ABSTRACT

A coupling device comprises a body in which a passageway is formed which extends from an end aperture of such body to receive a pipe. A collar is positioned partially within the passageway to allow axial translation and has an annular flange outside the end aperture and flexible arms which extend in the passageway. The coupling device further comprises a safety mechanism having a cylindrical portion capable of being fitted on the portion of pipe straddling the end aperture so as to position the cylindrical portion between the pipe and the collar. The safety mechanism also has a safety fork connected to the cylindrical portion and which accommodates positioning of the collar between the body and the annular flange of the collar to inhibit axial movement of the collar towards the body of the device.

16 Claims, 6 Drawing Sheets

(56) References Cited

U.S. PATENT DOCUMENTS

| | | | |
|---|---|---|---|
| 6,065,779 A * | 5/2000 | Moner et al. | 285/322 |
| 6,612,619 B2 * | 9/2003 | Wieder | 285/45 |
| 7,350,282 B2 * | 4/2008 | Tally et al. | 29/237 |
| 2006/0066101 A1 * | 3/2006 | Hollnagel | 285/319 |
| 2006/0082150 A1 * | 4/2006 | Kerin et al. | 285/319 |
| 2008/0231044 A1 * | 9/2008 | Gunderson | 285/93 |
| 2013/0069361 A1 * | 3/2013 | Cai et al. | 285/133.21 |

OTHER PUBLICATIONS

International Preliminary Report on Patentability issued on Aug. 13, 2013, in connection with International Application No. PCT/IT2011/000032.

* cited by examiner

PIPE COUPLING DEVICE

CROSS-REFERENCE TO RELATED APPLICATION

This application is a continuation of International Application No. PCT/IT2011/000032 having an international filing date of Feb. 8, 2011, entitled "Coupling Device". The '032 international application is hereby incorporated by reference herein in its entirety.

FIELD OF THE INVENTION

The present invention relates to a coupling device for a pipe, in particular for the connection of pipes in automotive gas systems. In particular, the solution proposed here finds its application in the part of the system characterized by high gas pressure.

BACKGROUND OF THE INVENTION

The application to vehicles of conversion systems enabling fuelling of the same engine by liquefied petrol or methane gas (CNG) thereby enabling a mixed fuel system has been known of for some time. The systems of the known type are generally composed of a gas tank, a pressure regulator which brings the gas to the right pressure for fuelling the engine, and a series of ducts and relative accessories.

The present coupling device can be used to join pipes and to connect pipes to accessories and valve devices of the system, from the gas-loading device to the gas pressure reducer device.

STATE OF THE ART

The use of connections, junctions and couplings is essential in automotive gas systems for joining the pipes to the devices needed to provide easy loading of the tank and optimal functioning of the system.

Currently, pipe-pipe, pipe-device and pipe-accessory connections in automotive gas systems are made using threaded couplings with sealing systems of various types. Threaded coupling, although providing the desired performance, take longer to attach and require the use of dedicated tools, such as spanners. The same considerations apply to dismantling, needed in the case of system maintenance.

Quick-fit coupling devices comprising a device body in which a passageway is made which extends from an end aperture of such body to receive a pipe and a collar positioned inside the passageway and having flexible arms suitable to co-operate with a cam surface made in the device body are already known of. The cam surface engages the flexible arms so that these are forced inwards, blocking the pipe when an attempt is made to extract the pipe from the body of the coupling device.

Such devices however are not suitable for use in automotive gas systems where pipes having an outer diameter of 6 mm are often used, in that they do not offer sufficient assurances against uncoupling of the pipe as a result of accidental impact or improper maintenance, or protection from external agents, or the certainty that the pipe is perfectly coupled before use of the system.

An object of the present coupling device is to realize a coupling device of the type with collar, so as to overcome the need for threading, easy and fast to use to connect and disconnect the piping and to offer the same assurances as a traditional coupling in terms of operating pressure, tightness, bursting pressure. The device should provide the required level of safety for operating with high pressure gas (<260 bar). The connection should also be such as to enable the attachment of a metal pipe having an outer diameter of 6 mm.

A further object of the present coupling device is to make a safe connection in order to prevent undesired and unexpected disconnections of the pipe, and a system which signals an improper connection.

SUMMARY OF THE INVENTION

One or more of the foregoing objects is achieved by a pipe coupling assembly comprising:
 (a) a body having a passage formed therein extending from an end aperture of the body to receive a pipe,
 (b) a collar positioned partially within the passageway, the collar having an annular flange positioned outside the end aperture and flexible arms extending inside the passageway, the flexible arms cooperable with a cam surface formed in the body, the cam surface comprising an inner conical portion extending in an axial direction and engageable with the flexible arms such that the flexible arms are urged inwardly by movement in the axial direction, a distal end of each of the flexible arms having on its inner side a radial projection engageable with an annular projection extending from the pipe;
 (c) a safety mechanism comprising:
  (i) a cylindrical portion disposed on a portion of the pipe straddling the end aperture such that the mechanism is positioned between the pipe and the collar; and
  (ii) a fork connected to the cylindrical portion and embracing the collar such that the collar is positioned between the body and the collar annular flange to inhibit axial movement of the collar towards the body.

In a preferred embodiment, the pipe annular projection defines, on a side facing the end aperture, a conical surface capable of acting as a cam to urge the flexible arms outwardly following axial movement of the collar towards the body.

In a preferred embodiment, the safety mechanism cylindrical portion has an inner diameter capable of accommodating a pipe having a diameter of 5.7-6.3 mm. The safety mechanism cylindrical portion preferably has a plurality of longitudinal slits formed herein alternately extending from one end of the cylindrical portion towards an opposite end such that the cylindrical portion is provided with resiliency sufficient to fit onto the pipe and over the annular projection. The safety mechanism cylindrical portion can also have a single longitudinal slit along its length, thereby enabling the cylindrical portion to resiliently widen to fit onto the pipe.

In a further preferred embodiment, the pipe coupling assembly further comprises, within the passageway and fitted onto an end portion of the pipe, at least one annular sealing gasket and a bushing having a flanged head on which the pipe annular projection rests. The passageway preferably has, beginning at the body end aperture, a first portion having a diameter slightly greater than that of the collar when the flexible arms are not engaged with the cam surface; a second portion having an initial divergent section, an intermediate substantially cylindrical section having a diameter allowing radial extension of the flexible arms, and a final convergent section; a third cylindrical portion having a diameter to accommodate the annular sealing gasket and the bushing; a fourth portion having a diameter slightly greater than that of the pipe and ending in an annular abutment surface accommodating the pipe end portion; and a fifth portion having a diameter substantially equal to the pipe inner diameter.

In another preferred embodiment, the body end aperture has a flared surface capable of acting as a guide for insertion of the flexible arms into the passageway.

In a preferred embodiment, the safety mechanism is formed from a thermoplastic polymeric material. The preferred thermoplastic polymeric material comprises polypropylene.

In a preferred embodiment, the pipe coupling assembly is connected to an end portion of a fluid supply pipe, the fluid supply pipe end portion having an annular projection engagable by the flexible arms. The pipe preferably has a diameter of 5.7-6.3 mm and the fluid supply pipe end portion annular projection preferably has a diameter of 6.5-12 mm. More preferably, the pipe end portion annular projection has a diameter of 10 mm. The fluid can be a vehicle fuel including automotive gas.

In a preferred embodiment, the body of the pipe coupling assembly resides in a component of a vehicle fueling system.

DETAILED DESCRIPTION OF PREFERRED EMBODIMENT(S)

Figure 1:
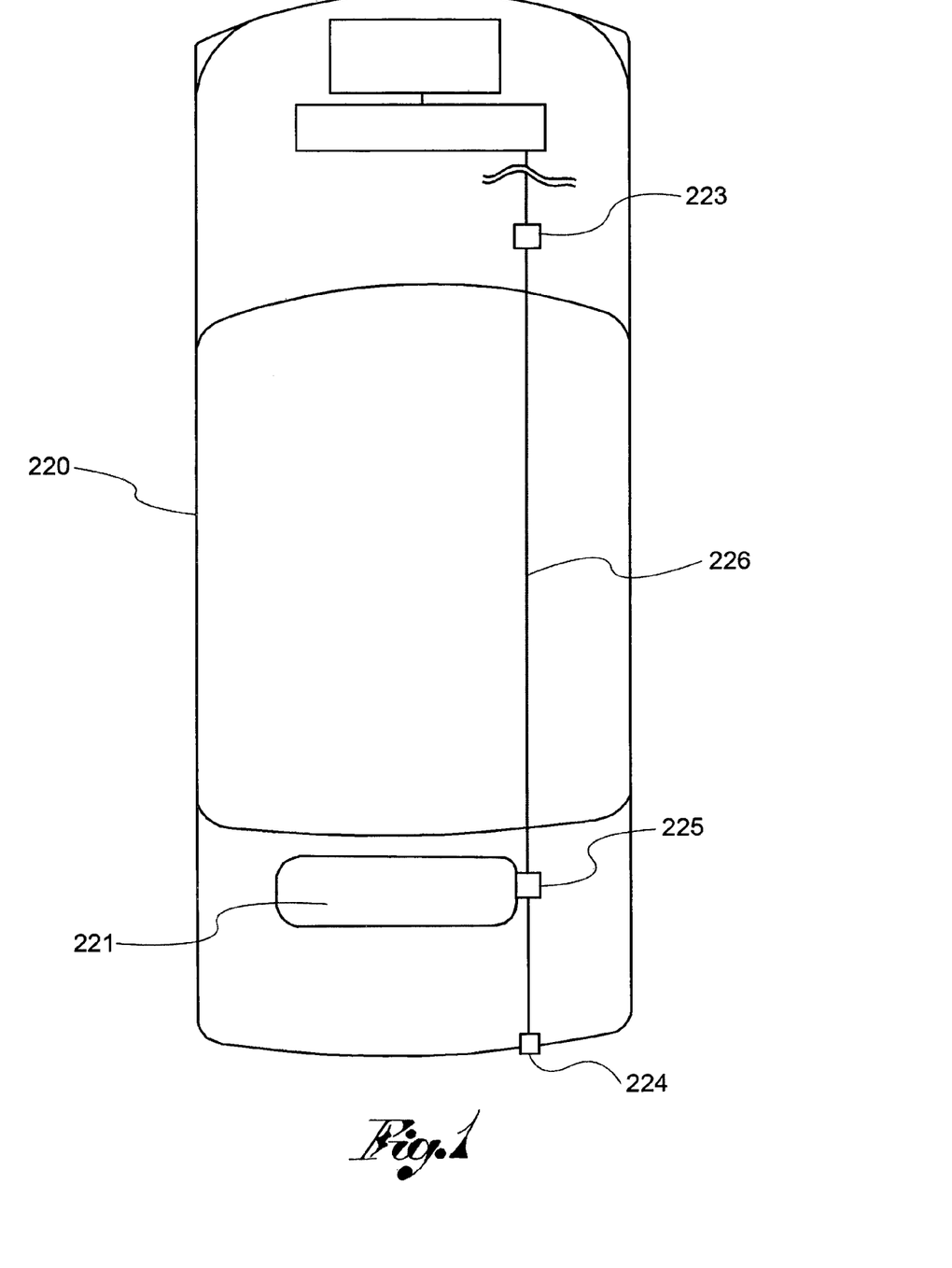
FIG. 1 is a schematic diagram of an automotive gas system.
Figure 2:
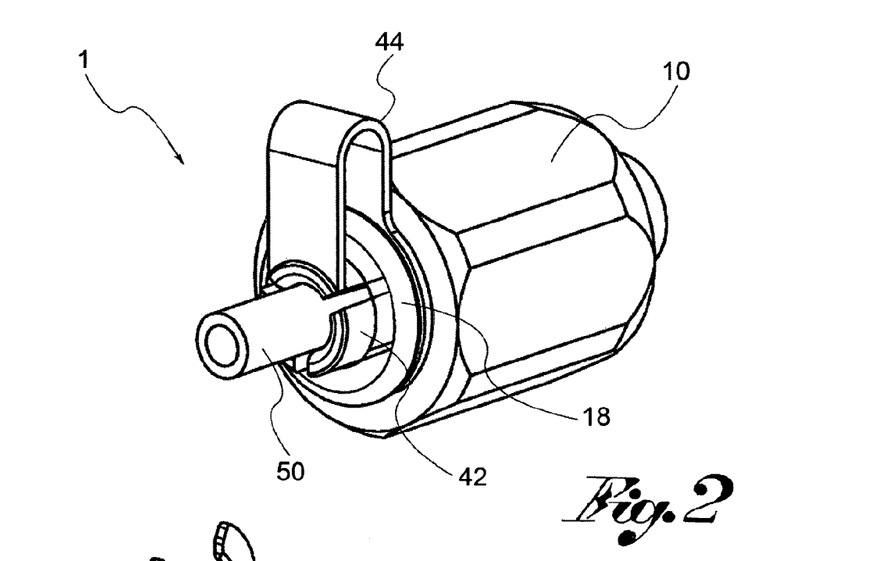
FIG. 2 is a perspective view of the present coupling device, with a portion of pipe inserted therein.

The present coupling device is particularly advantageous to apply to an automotive gas system of a vehicle 220, represented schematically in FIG. 1. In particular the present coupling device can be used to connect two pipes to each other or one pipe to a device of the system, in the part of the system in which there is a flow of high pressure gas, which for example comprises a loading device 224, a high pressure gas tank with relative control unit 225, a pipe 226 and a pressure regulation device 223.

Figure 3:
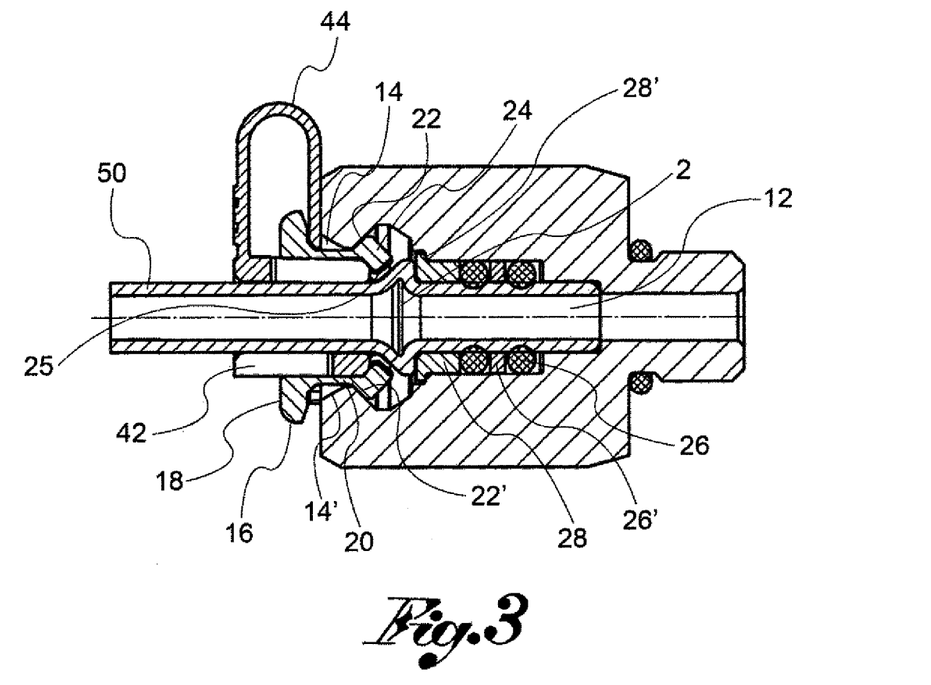
FIG. 3 is an axial cross-section view of the present coupling device with the pipe attached.
Figure 3A:
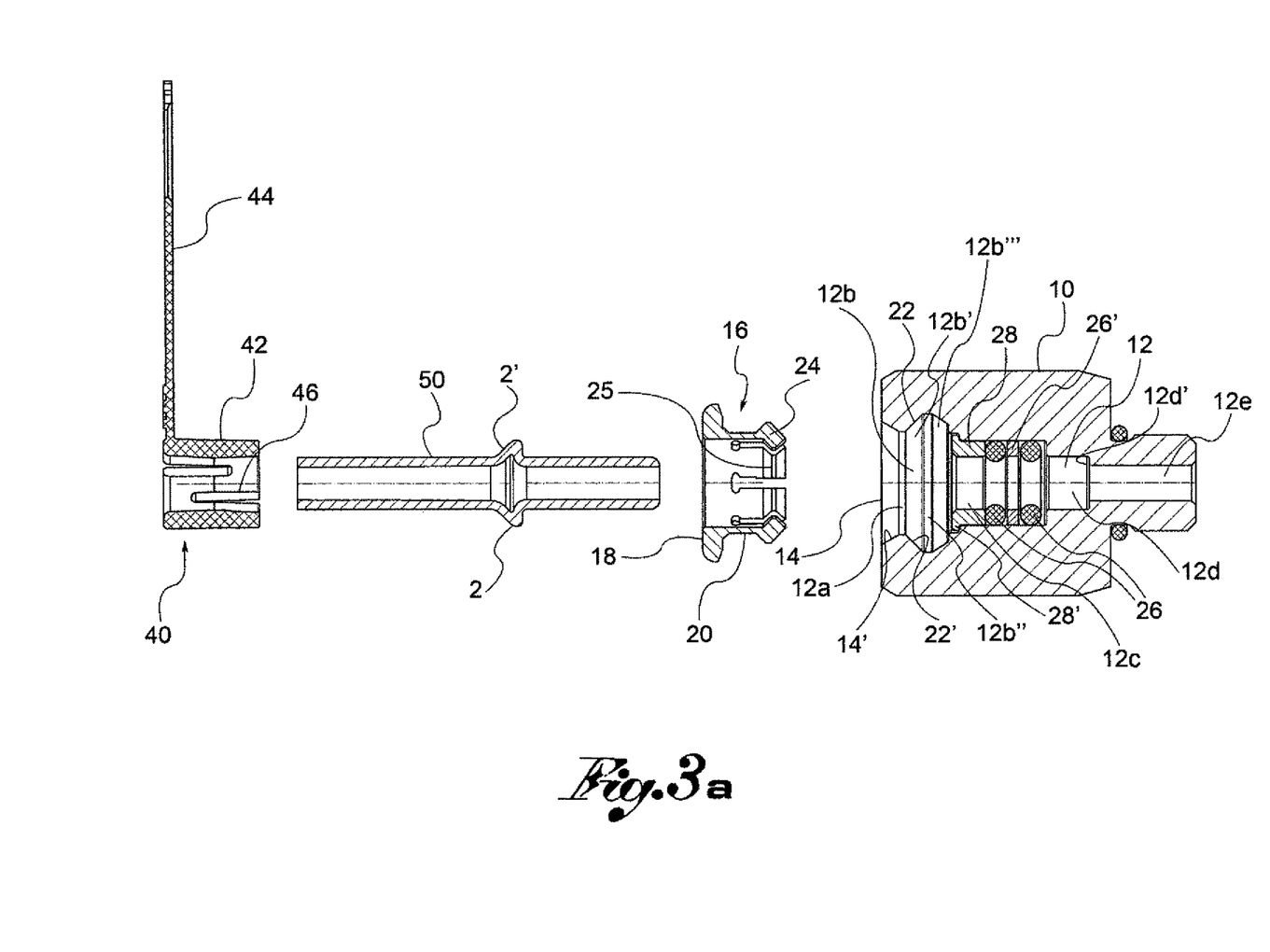
FIG. 3a is an exploded view, in axial cross-section, of the coupling device shown in FIG. 3 and of the portion of pipe attached thereto.
Figure 4:
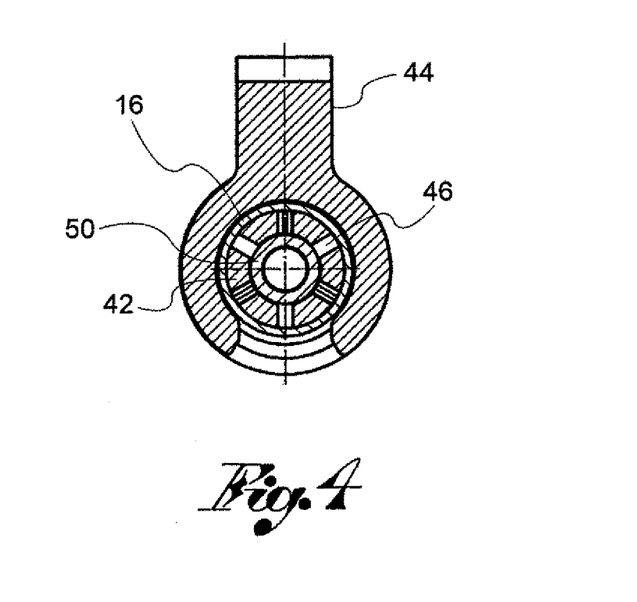
FIG. 4 is a transversal cross-sectional view of the present coupling device.

Coupling device 1 comprises a device body 10 in which a passageway or hole 12 is made which extends from an end aperture 14 of the body to receive a terminal portion 50 of a pipe. Later in the description the terms "front or forward" and "back or rearward" refer to the direction of insertion of terminal portion 50 of the pipe in the coupling device.

A collar 16 is positioned partially inside passageway 12 with the possibility of axial traction between a rearward, blocked position of the pipe and a forward position enabling release of the pipe. Collar 16 has an annular flange 18, outside end aperture 14, and flexible arms 20 which extend from annular flange 18 inside passageway 12. Flexible arms 20 are suitable to co-operate with a cam surface 22 made in device body 10. Such cam surface 22 comprises an inner conical portion 22' in an axial direction suitable to engage flexible arms 20 so that these are forced inwards following their axial movement in a rearward direction. Distal end 24 of each flexible arm 20 has on its inner side a radial projection 25 suitable to engage annular projection 2 of the pipe.

In a preferred embodiment, annular projection 2 of the pipe defines, on the side facing end aperture 14 of the device body, a conical surface 2' able to act as a cam to force flexible arms 20 outwards, following the axial movement or shifting of the collar towards the device body, that is, in a forward position.

In one embodiment, coupling device 1 further comprises, positioned inside passageway 12 so as to be fitted onto end portion 50 of the pipe, at least one annular sealing gasket 26, preferably two separated by a spacer 26', and a bushing 28 having a flanged head 28' which annular projection 2 of the pipe rests on.

More specifically (FIG. 3a), passageway 12 in device body 10 comprises, starting from open end 14 of the body, a first portion 12a having a diameter barely greater than that of collar 16 at the point of flexible arms 20 in a rest position, a second portion 12b having an initial divergent section 12b' which defines cam surface 22 of the device body, an intermediate section 12W' substantially cylindrical in diameter such as to allow radial spreading of flexible arms 20, and a final convergent section 12b''', a third cylindrical portion 12c having a diameter such as to house bushing 28 and annular sealing gasket 26, a fourth portion 12d having a diameter barely greater than that' of the pipe and ending with an annular abutment plane 12d' for the end of the pipe, and a fifth portion 12e having a diameter substantially equal to the inner diameter of the pipe.

Moreover, advantageously, end aperture 14 of device body 10 is delimited by a flared surface 14' acting as a guide for the insertion of flexible arms 20 of collar 16 in passageway 12 of the device body.

Figure 5:
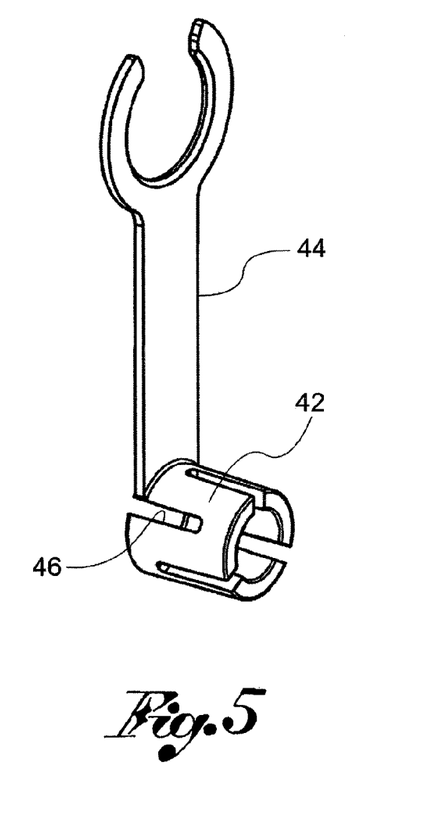
FIG. 5 is a perspective view of a safety mechanism of the present coupling device.
Figure 6:
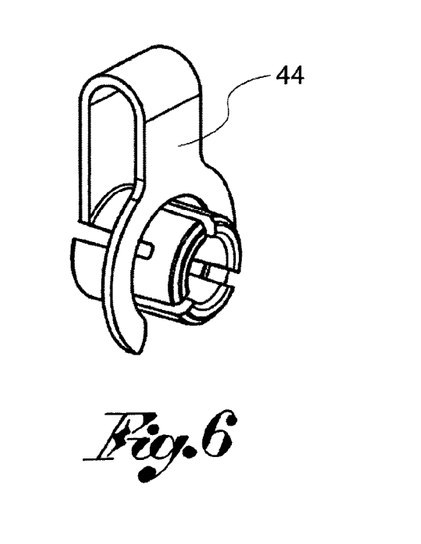
FIG. 6 shows the safety mechanism with the safety fork bent into the active position.
Figure 7:
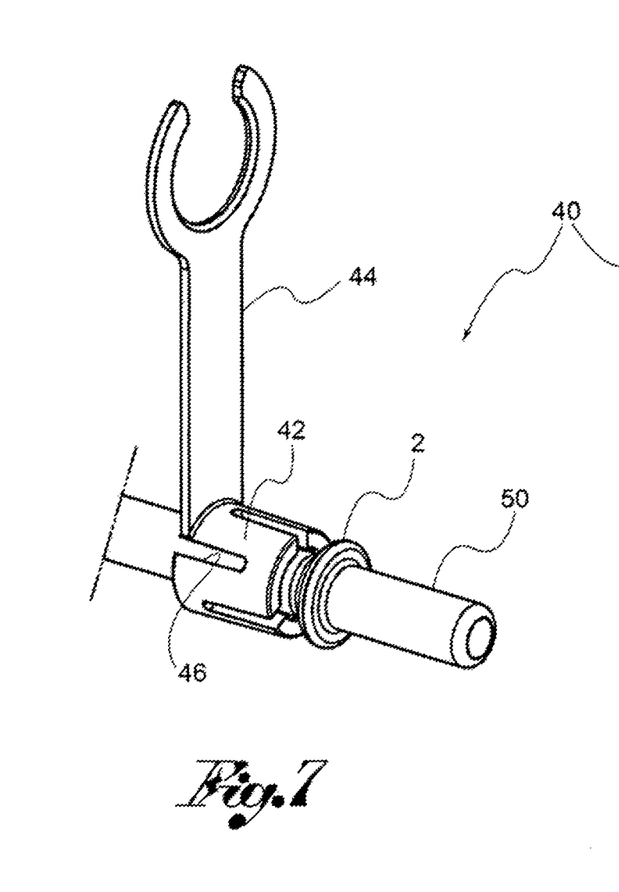
FIGS. 7 and 8 show, in a perspective and side views, the safety mechanism fitted into a pipe to be connected to the coupling device.
Figure 8:
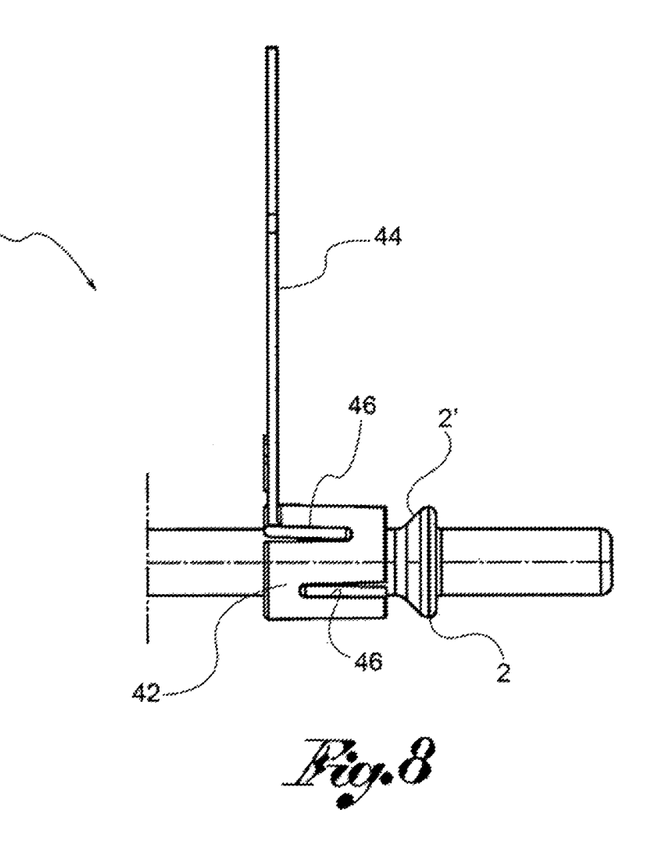

The coupling device further comprises a safety mechanism 40 suitable to inhibit accidental shifting of the collar in the forward direction, with the consequent risk of release of the pipe. To such purpose, safety mechanism 40 comprises a cylindrical portion 42 suitable to be fitted on the portion of pipe straddling end aperture 14 so as to position itself between the pipe and collar 16 and a safety fork 44 connected to the cylindrical portion and suitable to embrace collar 16 positioning itself between device body 10 and annular flange 18 of collar 16.

According to one embodiment, cylindrical portion 42 of safety mechanism 40 has a plurality of longitudinal slits 46 which, alternately, extend from one end of the cylindrical portion towards the opposite end, so as to give the cylindrical portion such elasticity or resiliency as to be fitted onto the pipe from the free end of the pipe, passing over annular projection 2.

Figure 9:
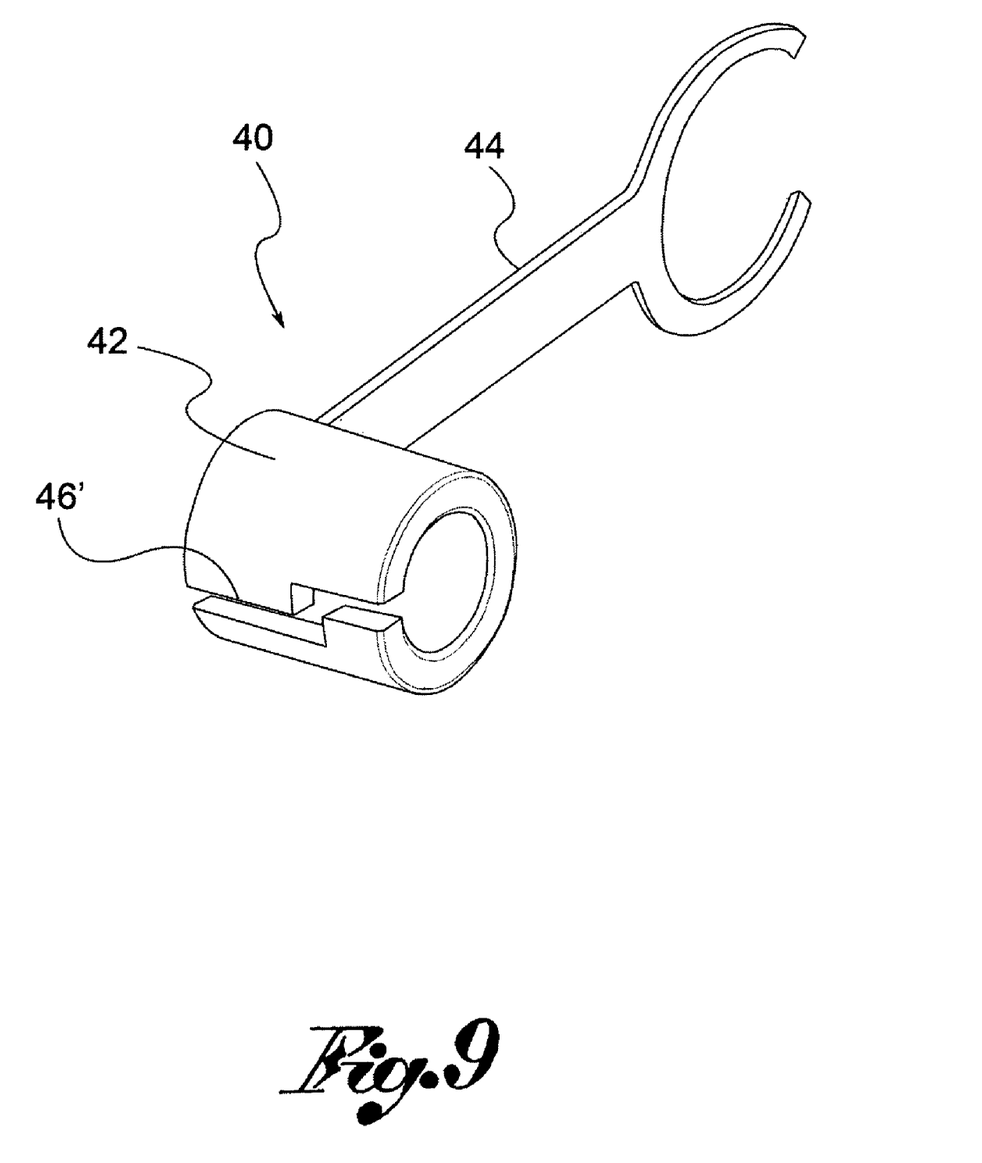
FIG. 9 shows a safety mechanism in one embodiment variation.

In an embodiment variation shown in FIG. 9, cylindrical portion 42 of the safety mechanism has a single longitudinal slit 46' along its length which enables the cylindrical portion to be elastically or resiliently widened to be fitted onto the portion of pipe 50. Preferably, longitudinal slit 46' has a stepped profile which inhibits external agents from penetrating inside the coupling device through the slit.

Preferably, safety mechanism 40 is made from a thermoplastic polymer, such as homopolymer propylene.

As mentioned above, the present device is particularly suitable for connecting a pipe which an automotive gas flows through, having an outer diameter typically of 6 mm plus or minus (±) 0.3 mm. Consequently, cylindrical portion 42 of safety mechanism 40 has an inner diameter such as to be closely fitted onto a pipe having such outer diameter of 6 mm±0.3 mm.

Since collar 16 is positioned above cylindrical portion 42 of safety mechanism 40, for flexible arms 20 to co-operate correctly with annular projection 2, annular projection 2 needs to be radially sized so as to bear in mind the thickness of cylindrical portion 42. For example, annular projection 2 has a diameter of 6.5 mm to 12 mm, preferably about 10 mm. According to one embodiment, annular projection 2 of the pipe is obtained by bending the pipe itself.

Inserting end portion 50 of the pipe in passageway 12 of the device body with a slight pressure therefore, thanks to the interaction of annular projection 2 of the pipe and distal end 24 of the flexible arms, the radial expansion of these is caused until annular projection 2 passes over the flexible arms and abuts against flanged head 28' of bushing 28. Flexible arms 20 then return to a rest position.

At this point, it is possible to insert safety fork 44 between flange 18 of collar 16 and device body 1.

An axial shift of the pipe in a rearward direction causes the interaction of conical surface 2' of annular projection 2 and distal end 24 of flexible arms 20. Following such interaction, distal end 24 of flexible arms 20 is engaged in turn by inclined surface 22' of cam 22 of device body 1 and therefore tends to flex radially inwards, blocking the pipe.

To extract the pipe from the coupling device, safety fork 44 should be removed from collar 16 so as to allow the axial shifting of this to a forward position. In fact by pressing collar 16 forwards and contemporarily pulling the pipe backwards, distal ends 24 of flexible arms 20 are made to slide along conical surface 2' of annular projection 2. The flexible arms widen radially until annular projection 2 is able to pass through them thereby freeing the pipe from the collar.

It is worth noting that the safety mechanism 40 also performs its function at the moment of installing the pipe, not just to inhibit accidental release; in fact, if there is not enough space between collar 16 and device body 10 for attachment of safety fork 44, this means that the pipe has not been fully inserted in the device and therefore needs to be refitted.

Cylindrical portion 42 of safety mechanism 40 advantageously has various functions:
(a) Damping vibrations between the pipe and coupling device, in particular between the pipe and the internal sealing gaskets which could suffer deterioration on account of such vibrations (especially in the preferred application of the device in a vehicle),
(b) Protecting the coupling device from the intrusion of dirt, water, salt or ice, in particular for applications under the vehicle body and therefore exposed to such agents;
(c) Allowing the safety fork to remain permanently connected to the pipe,
(d) Acting as an adaptor to provide, even after prolonged use, a more stable position, a reduction of the vibrations, a protection of the coupling device from external agents, and therefore improved reliability of the device over time, even using 6 mm pipes typical of the gas system sector (especially methane gas), where the operating pressures in play are approximately 220 bar, associated with a collar already available in various applications for the blockage of pipes of greater dimensions (typically of 8 mm).

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A pipe coupling assembly comprising:
(a) a body having a passage formed therein extending from an end aperture of said body to receive a pipe,
(b) a collar positioned partially within said passageway, said collar having an annular flange positioned outside said end aperture and flexible arms extending inside said passageway, said flexible arms cooperable with a cam surface formed in said body, said cam surface comprising an inner conical portion extending in an axial direction and engageable with said flexible arms such that said flexible arms are urged inwardly by movement in said axial direction, a distal end of each of said flexible arms having on its inner side a radial projection engageable with an annular projection extending from said pipe;
(c) a safety mechanism comprising:
(i) a cylindrical portion disposed on a portion of said pipe straddling said end aperture such that said mechanism is positioned between said pipe and said collar; and
(ii) a fork connected to said cylindrical portion and embracing said collar such that said fork is positioned between said body and said collar annular flange to inhibit axial movement of said collar towards said body.

2. The pipe coupling assembly of claim 1, wherein said pipe annular projection defines, on a side facing said end aperture, a conical surface capable of acting as a cam to urge said flexible arms outwardly following axial movement of said collar towards said body.

3. The pipe coupling assembly of claim 1, wherein said safety mechanism cylindrical portion has an inner diameter capable of accommodating a pipe having a diameter of 5.7-6.3 mm.

4. The pipe coupling assembly of claim 1, wherein said safety mechanism cylindrical portion has a plurality of longitudinal slits formed herein alternately extending from one end of said cylindrical portion towards an opposite end such that said cylindrical portion is provided with resiliency sufficient to fit onto said pipe and over said annular projection.

5. The pipe coupling assembly of claim 1, wherein said safety mechanism cylindrical portion has a single longitudinal slit along its length, thereby enabling said cylindrical portion to resiliently widen to fit onto said pipe.

6. The pipe coupling assembly of claim 1, further comprising, within said passageway and fitted onto an end portion of said pipe, at least one annular sealing gasket and a bushing having a flanged head on which said pipe annular projection rests.

7. The pipe coupling assembly of claim 6, wherein said passageway has, beginning at said body end aperture, a first portion having a diameter slightly greater than that of said collar when said flexible arms are not engaged with said cam surface; a second portion having an initial divergent section, an intermediate substantially cylindrical section having a diameter allowing radial extension of said flexible arms, and a final convergent section; a third cylindrical portion having a diameter to accommodate said annular sealing gasket and said bushing; a fourth portion having a diameter slightly greater than that of said pipe and ending in an annular abutment surface accommodating said pipe end portion; and a fifth portion having a diameter substantially equal to said pipe inner diameter.

8. The pipe coupling assembly of claim 1, wherein said end aperture has a flared surface capable of acting as a guide for insertion of said flexible arms into said passageway.

9. The pipe coupling assembly of claim 1, wherein said safety mechanism is formed from a thermoplastic polymeric material.

10. The pipe coupling assembly of claim 9, wherein said thermoplastic polymeric material comprises polypropylene.

11. The pipe coupling assembly of claim 1, wherein said assembly is connected to an end portion of a fluid supply pipe, said fluid supply pipe end portion having an annular projection engagable by said flexible arms.

12. The pipe coupling assembly of claim 11, where said pipe has a diameter of 5.7-6.3 mm and wherein said fluid supply pipe end portion annular projection has a diameter of 6.5-12 mm.

13. The pipe coupling assembly of claim 12, wherein said pipe end portion annular projection has a diameter of 10 mm.

14. The pipe coupling assembly of claim 11, wherein said fluid is a vehicle fuel.

15. The pipe coupling assembly of claim 14, wherein said vehicle fuel is automotive gas.

16. The pipe coupling assembly of claim 1, wherein said body resides in a component of a vehicle fueling system.

\* \* \* \* \*